(12) United States Patent
Park et al.

(10) Patent No.: US 11,420,498 B2
(45) Date of Patent: Aug. 23, 2022

(54) PHOTO SENSOR STRUCTURE

(71) Applicants: Hyundai Motor Company, Seoul (KR); Kia Motors Corporation, Seoul (KR); Kyungshin Corp., Incheon (KR)

(72) Inventors: Jong Min Park, Seoul (KR); Dong Myeong Lee, Incheon (KR); Doo Hyun Kim, Suwon-si (KR); Nam Joon Yoo, Jeollabuk-do (KR); Rae Jin Kang, Incheon (KR)

(73) Assignees: Hyundai Motor Company, Seoul (KR); Kia Motors Corporation, Seoul (KR); Kyungshin Corp., Incheon (KR)

( * ) Notice: Subject to any disclaimer, the term of this patent is extended or adjusted under 35 U.S.C. 154(b) by 355 days.

(21) Appl. No.: 16/683,969

(22) Filed: Nov. 14, 2019

(65) Prior Publication Data

US 2020/0353789 A1    Nov. 12, 2020

(30) Foreign Application Priority Data

May 10, 2019   (KR) .................. 10-2019-0054852

(51) Int. Cl.
*B60H 1/00*    (2006.01)
*G01J 1/42*    (2006.01)
(Continued)

(52) U.S. Cl.
CPC .............. *B60H 1/0075* (2013.01); *G01J 1/06* (2013.01); *G01J 1/4204* (2013.01); *G07C 5/08* (2013.01)

(58) Field of Classification Search
CPC .... G01J 1/42; G01J 14/4204; G01J 2001/061; G01J 1/06; B60H 1/00735; B60H 1/0075; G07C 5/08
See application file for complete search history.

(56) References Cited

U.S. PATENT DOCUMENTS 4,760,772 A  *  8/1988  Horiguchi .......... G05D 23/1917
                                                                454/75
4,890,460 A  *  1/1990  Takasi .................. B60H 1/0075
                                                                126/573

(Continued)

FOREIGN PATENT DOCUMENTS

JP     2011-013172    1/2011
JP     2012-177576    9/2012
(Continued)

*Primary Examiner* — John R Lee
(74) *Attorney, Agent, or Firm* — Lempia Summerfield Katz LLC

(57) ABSTRACT

The present disclosure provides a photosensor structure including a left photosensor located at the left side of a front windshield of a vehicle viewed from the outside of the vehicle, and a right photosensor located symmetrically to the left photosensor. For example, the left photosensor includes two light reception windows located in a width direction of the vehicle to set a lateral incidence angle having a maximum incidence amount in a left-and-right direction of a light source, a dummy portion located on at least one of the two light reception windows between the two light reception windows to set an incidence altitude having a maximum incidence amount in an upward-and-downward direction of the light source, and light reception units located on lower ends of the light reception windows to measure the amount of light received from the light source through the light reception windows.

10 Claims, 9 Drawing Sheets

(51) Int. Cl.
*G01J 1/06* (2006.01)
*G07C 5/08* (2006.01)

(56) References Cited

U.S. PATENT DOCUMENTS

| | | | | |
|---|---|---|---|---|
| 5,056,421 | A * | 10/1991 | Iida | B60H 1/0075 454/75 |
| 5,072,105 | A * | 12/1991 | Osawa | G01S 3/7862 250/206.1 |
| 5,602,384 | A * | 2/1997 | Nunogaki | B60H 1/0075 126/573 |
| 5,857,536 | A * | 1/1999 | Wieszt | B60H 1/0075 180/69.2 |
| 5,957,375 | A * | 9/1999 | West | B60H 1/0075 236/91 C |
| 6,185,950 | B1 * | 2/2001 | Baruschke | B60H 1/0075 236/91 C |
| 6,888,120 | B2 * | 5/2005 | Chiasson | B60H 1/0075 250/203.4 |
| 7,115,850 | B2 * | 10/2006 | Niemann | B60H 1/0075 250/203.4 |
| 7,619,202 | B2 * | 11/2009 | Yu | H04B 10/1141 250/215 |
| 7,906,751 | B2 * | 3/2011 | Kubiak | G01J 1/0437 250/203.4 |
| 8,330,591 | B2 * | 12/2012 | Ziehr | B60H 1/0075 340/426.26 |
| 8,744,673 | B2 * | 6/2014 | Shiroyama | B60H 1/00814 701/36 |
| 9,344,691 | B2 * | 5/2016 | Hirai | G02B 5/201 |
| 10,228,281 | B2 * | 3/2019 | Ishihara | G01J 1/06 |
| 2007/0131782 | A1 * | 6/2007 | Ziehr | B60H 1/00771 236/1 B |
| 2009/0213601 | A1 * | 8/2009 | Clugston, Jr. | G01J 1/42 362/464 |
| 2010/0013619 | A1 * | 1/2010 | Zimmer | G01J 1/02 340/449 |
| 2010/0212880 | A1 * | 8/2010 | Ripoll | B60H 1/0075 165/287 |
| 2013/0155396 | A1 | 6/2013 | Deliwala | |
| 2018/0010960 | A1 * | 1/2018 | Ookura | G01J 1/4228 |
| 2018/0229579 | A1 * | 8/2018 | Han | G01J 1/4228 |
| 2019/0277689 | A1 * | 9/2019 | Milpied | G01S 3/784 |
| 2020/0017023 | A1 * | 1/2020 | Anderson | G01J 1/0209 |
| 2020/0353789 | A1 * | 11/2020 | Park | G01J 1/1626 |

FOREIGN PATENT DOCUMENTS

| | | |
|---|---|---|
| KR | 10-1998-0040744 | 8/1998 |
| KR | 10-0654975 | 7/2005 |

* cited by examiner

[ PHOTOSENSOR SYSTEM CONFIGURATION ]

* R2=C/D(Default 0.64)

[0-DEGREE INCIDENCE]

[LEFT 20-DEGREE INCIDENCE]

[LEFT 45-DEGREE INCIDENCE]

PHOTO SENSOR STRUCTURE

CROSS-REFERENCE TO RELATED APPLICATION

This application claims priority to and the benefit of Korean Patent Application No. 10-2019-0054852, filed on May 10, 2019, which is incorporated herein by reference in its entirety.

FIELD

The present disclosure relates to a photosensor structure, and more particularly, to a photosensor structure located on a windshield of a vehicle.

BACKGROUND

The statements in this section merely provide background information related to the present disclosure and may not constitute prior art In order to maintain a temperature and humidity requested by a user according to the indoor environment of a vehicle, an air conditioner for controlling the temperature and humidity of outside or inside air of the vehicle is being used as a desired element.

Furthermore, the air conditioner installed in the vehicle is configured to automatically control the fan speed according to the inside temperature of the vehicle, and the inside temperature of the vehicle is determined according to solar radiation amount (the amount of light).

In general, a photosensor (solar sensor) is mounted in order to measure the amount of the sunlight introduced into the vehicle, and the running and strength of the air conditioner are controlled according to the amount of light measured through the photosensor (solar sensor).

Such a photosensor (solar sensor) is provided with a left-direction detection sensor unit and a right-direction detection sensor unit, in order to measure the amount of light introduced into the left and right sides of the vehicle according to the lateral incidence angle of the sun.

Furthermore, each sensor unit receives the amount of light of a light source and outputs a signal corresponding thereto. The temperature control device of the vehicle controls the temperature of the vehicle based on this output signal.

For example, when the incidence direction of the sunlight is the front and left side of the vehicle, the temperature control device of the vehicle increases the strength of air conditioning in the left side (the driver seat or the passenger seat) of the vehicle, and when the incidence direction of the sunlight is the front-right side of the vehicle, the temperature control device of the vehicle increases the strength of air conditioning in the right side (the passenger seat or the driver seat) of the vehicle, thereby compensating for the amount of the solar radiation in the vehicle.

Meanwhile, a conventional photosensor has largest output property when sunlight is incident at an angle of 90 degrees. However, when the light of the sun as a light source has an incidence altitude of an angle of 90 degrees, the amount of light introduced into the inside of the vehicle may be different from the amount of light measured by the photosensor.

In the amount of light actually introduced into the inside of the vehicle, we have discovered that a highest amount of heat is provided to the user located inside the vehicle when sunlight is introduced into the vehicle at 60 degrees with respect to the front side of the vehicle.

However, in the related art, the air conditioner is controlled based on the amount of light received through the photosensor, without considering the incidence angle of the sunlight for providing the highest amount of heat to the passenger.

Document Korean Patent Application No. 10-2005-0068440 relates to a sunlight sensor in a vehicle for controlling the output of an air conditioner of the vehicle.

The above information disclosed in this Background section is only for enhancement of understanding of the background of the disclosure, and therefore it may contain information that does not form the prior art that is already known in this country to a person of ordinary skill in the art.

SUMMARY

The present disclosure is to provide a photosensor structure for providing light reception performance considering the position of a light source for emitting light introduced into a vehicle.

In addition, the present disclosure is to provide a photosensor structure for controlling an air conditioner of an individual according to the location of occupants by the photosensor structure capable of accurately measuring the amount of light introduced into a vehicle.

According to one aspect of the present disclosure, a photosensor structure for a vehicle defining a longitudinal axis includes a left photosensor located at the left side of a windshield of a vehicle, and a right photosensor located symmetrically to the left photosensor about the longitudinal axis. In addition, each of the left and right photosensors includes two light reception windows located in a width direction of the vehicle to set a lateral incidence angle having a maximum incidence amount in a left-and-right direction of a light source, a dummy portion located on at least one of the two light reception windows between the two light reception windows to set an incidence altitude having a maximum incidence amount in an upward-and-downward direction of the light source, and light reception units located on lower ends of the light reception windows to measure the amount of light received from the light source through the light reception windows.

Each of the two light reception windows may include a first window located close to a side (a lateral side) of the windshield, and a second window located adjacent to the first window, and the lateral incidence angle having the maximum lateral incidence amount may be determined according to a ratio of a width of the second window to a width of the first window.

The incidence angle having the maximum incidence amount of the light source may become closer to 0° as the ratio (R1=A/B) of the width (A) of the second window to the width (B) of the first window increases.

The first window may have a smaller width than the second window.

The dummy portion may set the incidence altitude having the maximum incidence amount according to a ratio (R2=C/D) of a distance (C) between a front end of the dummy portion and a front end of a photosensor to a distance (D) between a rear end of the dummy portion and a rear end of the photosensor.

The incidence altitude having the maximum incidence amount may increase as the ratio (R2=C/D) increases.

The dummy portion may be located at one end of the second window close to the first window.

According to a further aspect of the present disclosure, the photosensor structure may include a controller configured to control an air conditioner of the vehicle according to the lateral incidence angle and incidence altitude measured by the light reception units according to the amount of light introduced through the left photosensor and the right photosensor.

The controller may be configured to compare the amounts of light received by the left photosensor and the right photosensor and to control output of the air conditioner located inside the vehicle according to the amounts of the received light.

The controller may be configured to control output of the air conditioner of the vehicle based on the amount of light applied according to the incidence altitude of the light source.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 9A:
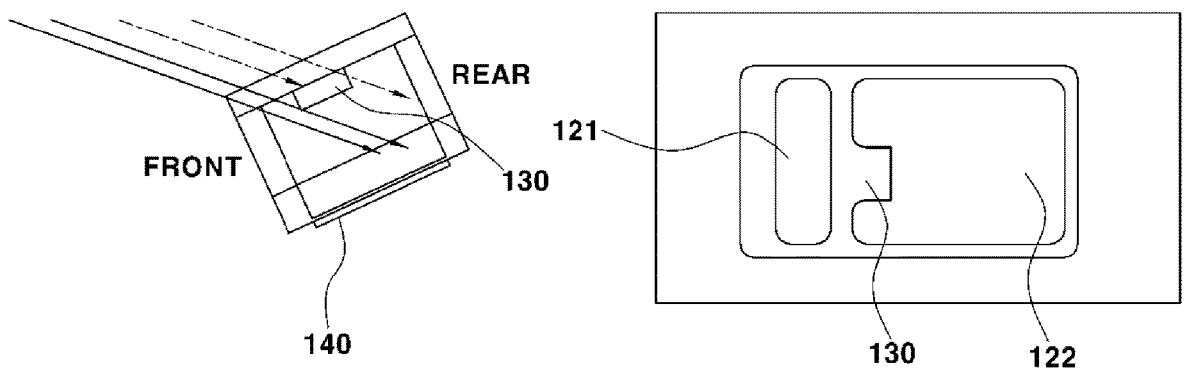
FIG. 9a is a view showing a path of light introduced into a photosensor when a light source has a low incidence altitude in a longitudinal direction of a vehicle according to a form of the present disclosure.
Figure 9B:
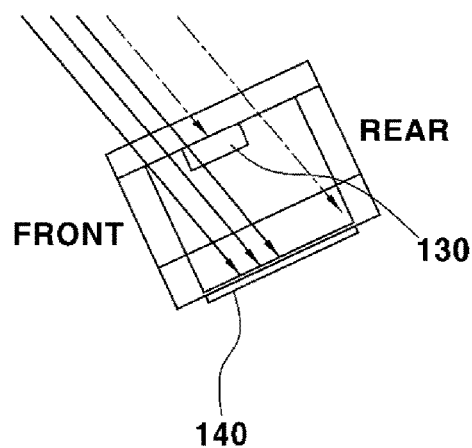
FIG. 9b is a view showing a path of light introduced into a photosensor when a light source has an intermediate incidence altitude in a longitudinal direction of a vehicle according to a form of the present disclosure.
Figure 9C:
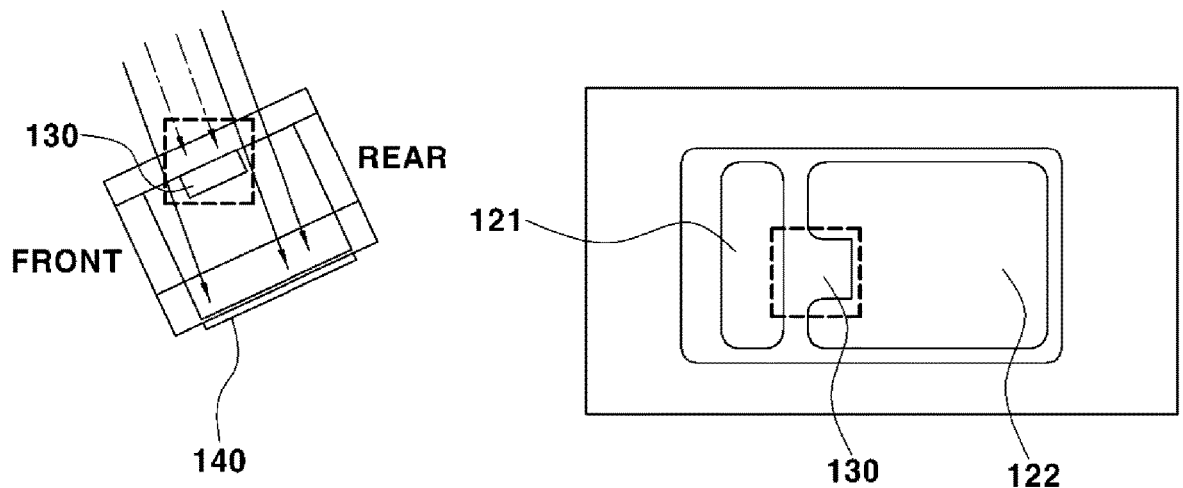
Figure 10:
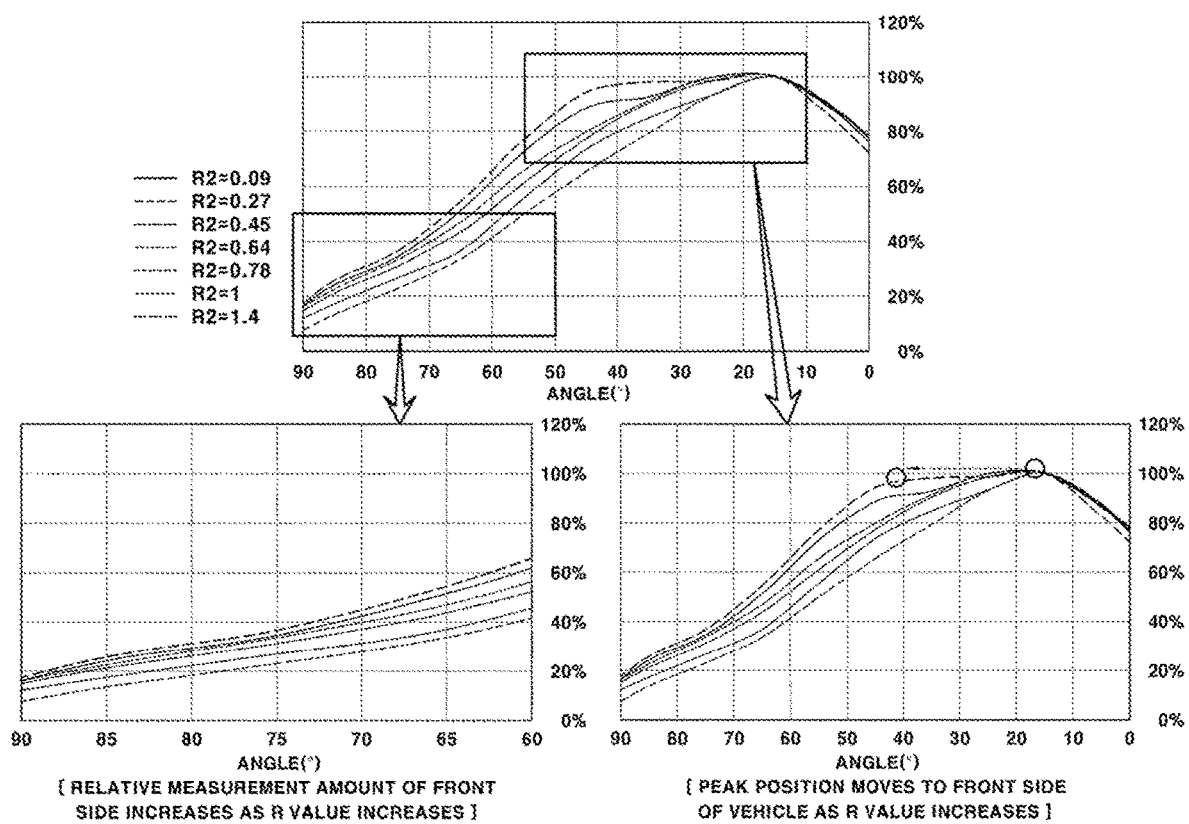

FIG. 9c is a view showing a path of light introduced into a photosensor when a light source has an optimal incidence altitude in a longitudinal direction of a vehicle according to a form of the present disclosure; and FIG. 10 is a view showing output change of a photosensor according to a position of a dummy portion in movement of a light source in a longitudinal direction of a vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terms "unit", "-or/er" and "module" described in the specification indicate a unit for processing at least one function or operation, which may be implemented by hardware, software or a combination thereof.

In the present disclosure, the terms first, second, etc. are used to distinguish the components having the same name from each other and the order of the components are not limited thereto in the following description.

In the present disclosure, the term "incidence altitude" is defined as being 0 degrees when the sun is located in front of a vehicle and 90 degrees when the sun is located directly above the roof of the vehicle.

In addition, in the present disclosure, a photosensor located on the left side of a windshield at the outside of a front surface of a vehicle is referred to as a left photosensor and a photosensor located on the right side of the windshield is referred to as a right photosensor. The left and right sides are determined according to the relative positions of two symmetrically configured photosensors.

In addition, in the present disclosure, the incidence altitude and lateral incidence angle of the light source may be simultaneously or independently determined through a photosensor device. However, in the present disclosure, the incidence altitude and the lateral incidence angle are distinguishably described. Further, the amount of light received by the photosensor device is influenced by both the incidence altitude and the lateral incidence angle.

Figure 1:
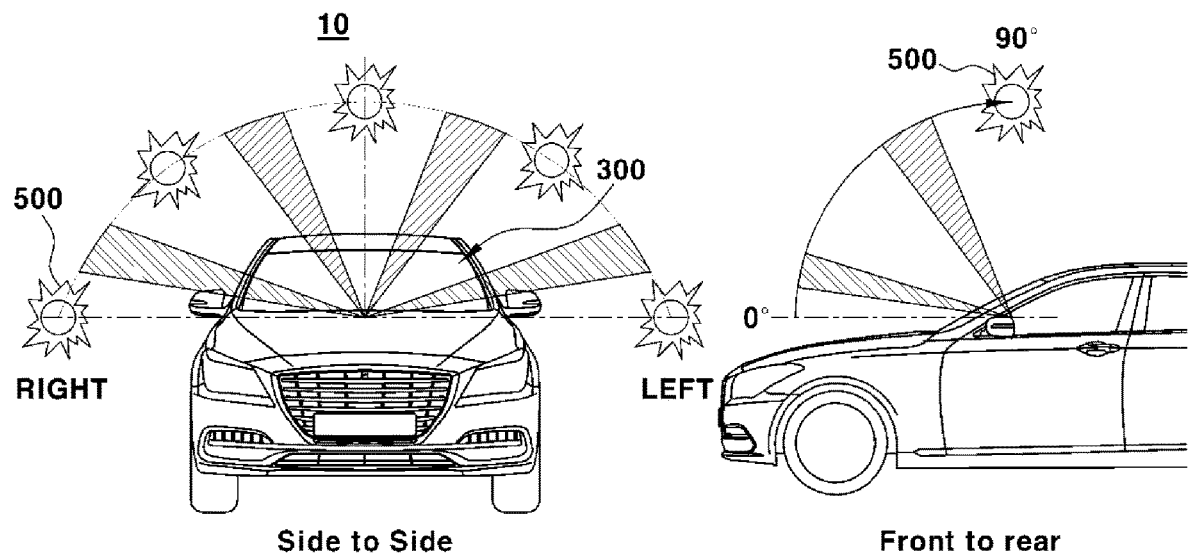
FIG. 1 is a view showing an incidence altitude and a lateral incidence angle of light introduced into a photosensor structure located at a vehicle according to a form of the present disclosure.

FIG. 1 shows the front and side views of a vehicle 10 including a photosensor structure.

As shown in the figure, in the present disclosure, the sun is used as a light source 500 and criteria of left and right incidence angles of light from the light source 500 to the vehicle 10 are shown. The sun located at the uppermost portion of the vehicle 10 is set to 0 degrees and the light source 500 horizontally located at the sides of the vehicle when viewed from the front side of the vehicle is set to 90 degrees left (negative) and 90 degrees right (positive).

In addition, in the longitudinal direction of the vehicle 10 (Front to Rear), the light source located at the uppermost portion of the roof of the vehicle 10 to be perpendicular to the horizontal direction (0 degrees) of the vehicle 10 is set to 90 degrees.

When the light source 500 moves to the side of the vehicle 10 when viewed from the front side of the vehicle 10, a left photosensor and a right photosensor for measuring the amount of light incident upon the windshield 300 of the vehicle 10 may be operated and air conditioners (not shown) located inside the vehicle 10 may individually perform air conditioning according to the amount of light measured by the left photosensor and the right photosensor according to the incidence angle of the light source 500.

In addition, all air conditioners located inside the vehicle 10 may be operated based on the amounts of light measured by the two photosensors according to the incidence altitude of the light source 500 in the forward-and-backward direction of the vehicle 10.

That is, in the present disclosure, all of the air conditioning reference values in the air conditioners may be set based on the incidence altitude of the light source 500 located in the forward-and-backward direction of the vehicle 10, and the amount of light introduced into each of a driver seat and a passenger seat of the vehicle 10 may be measured according to the incidence angle of the light source 500 located at the left and right sides of the vehicle 10 to individually perform air conditioning of each seat.

Figure 2:
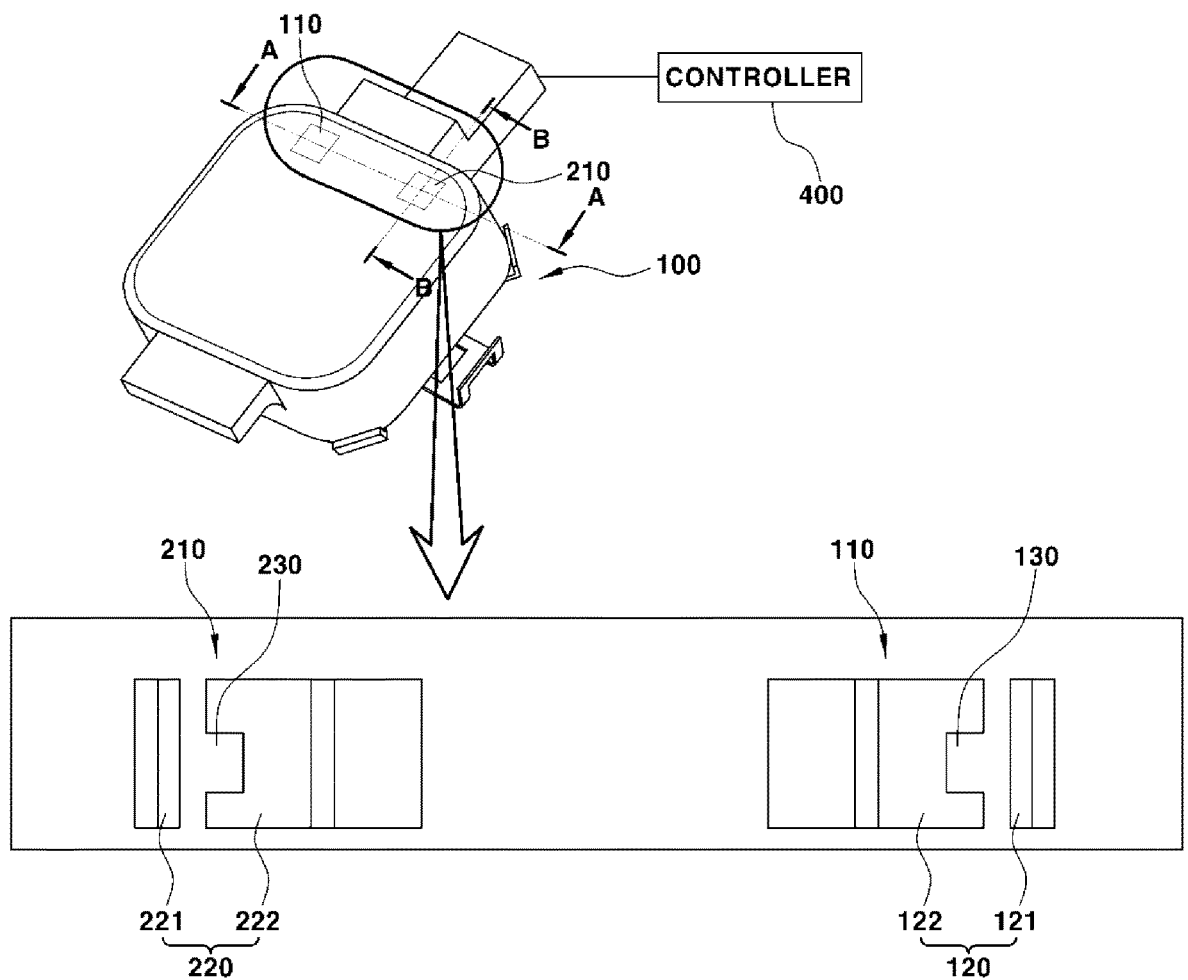
FIG. 2 is a view showing two photosensors symmetrically arranged according to a form of the present disclosure.

FIG. 2 is showing a photosensor device 100 located on an inner surface of a windshield 300 of a vehicle 10 according to a form of the present disclosure.

As shown in the figure, the photosensor device 100 is connected to a controller 400 located inside the vehicle and is configured to apply current according to the amount of light received by the photosensor device 100.

Figure 5A:
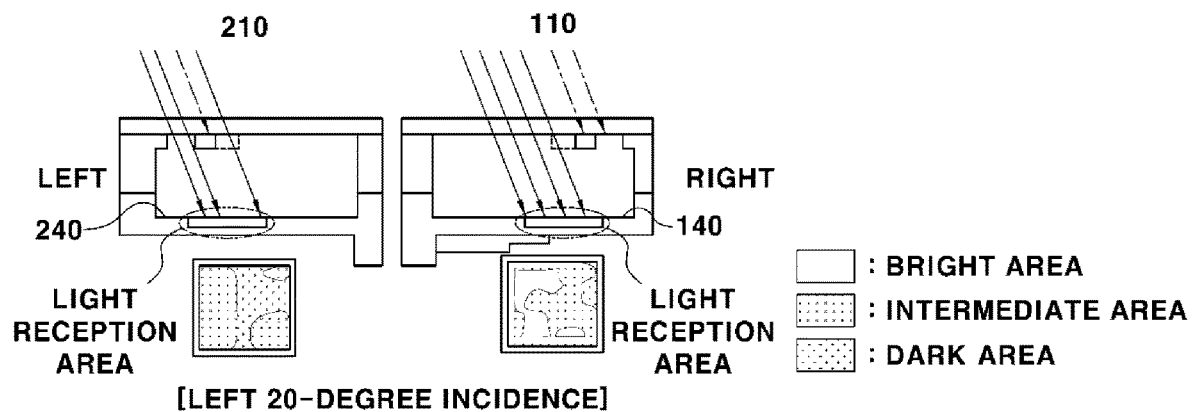
FIG. 5a is a view showing paths of light introduced into two photosensors when a light source has an incidence angle of 20 degrees left according to a form of the present disclosure.

More preferably, the light reception units 140 and 240 of the photosensor device 100 generate current according to the amount of light received based on the position of the light source, and the controller 400 determines the amount of received light according to the level of the current (see FIG. 5a).

The photosensor device 100 of the present disclosure is configured to output a relatively high current value when the amount of light introduced into the light reception units 140 and 240 is large and to output a relatively low current value when the amount of light introduced into the light reception units 140 and 240 is small.

The controller 400 is located inside the vehicle and is configured to receive current from the photosensor device 100, to determine the amount of light, and to control the air conditioners of the vehicle.

More preferably, the controller 400 may be configured to control the air conditioners of the vehicle according to the amount of light received by the left photosensor 110 and the right photosensor 210 and to control air conditioning output of the driver seat and the passenger seat according to lateral incidence angle of the light source 500.

The photosensor device 100 includes the left photosensor 110 located at the left side of the windshield 300 of the vehicle when viewed from the outside of the vehicle 10 and the right photosensor 210 bilaterally symmetrical to the left photosensor 110.

As shown in FIG. 2, the left photosensor 110 includes two light reception windows 121 and 122 sequentially located in the width direction of the vehicle to correspond to the lateral incidence angle of the light source 500, and a first dummy portion 130 disposed in at least one of the two light reception windows 121 and 122 and located between the light reception windows 121 and 122.

That is, in one form of the present disclosure, a first window 121 located close to the side surface of the windshield 300 and a second window 122 located adjacent to the first window 121 are included. The lateral incidence angle having a maximum amount of incident light may be set according to a ratio of the width of the second window 122 to the width of the first window 121 formed in the width direction of the vehicle.

Further, in one form of the present disclosure, the first dummy portion 130 located at the second window 122 may be configured to set a maximum incidence altitude having a maximum amount of light supplied from the light source 500 to the front side of the vehicle.

That is, in the present disclosure, the first dummy portion 130 is configured to set the maximum incidence altitude, at which the light source 500 is located in the longitudinal direction of the vehicle.

In addition, in the present disclosure, the right photosensor 210 bilaterally symmetrical to the left photosensor 110 with respect to the central axis of the vehicle in the longitudinal direction is configured to include a third window 221, a fourth window 222 and a second dummy portion 230 to respectively correspond to the first window 121, the second window 122 and the first dummy portion 130.

More preferably, the second dummy portion 230 may be provided at a position substantially corresponding to the first dummy portion 130, and may be configured to set a maximum incidence altitude having the maximum amount of light in the right photosensor 210, like the first dummy portion 130.

Figure 3:
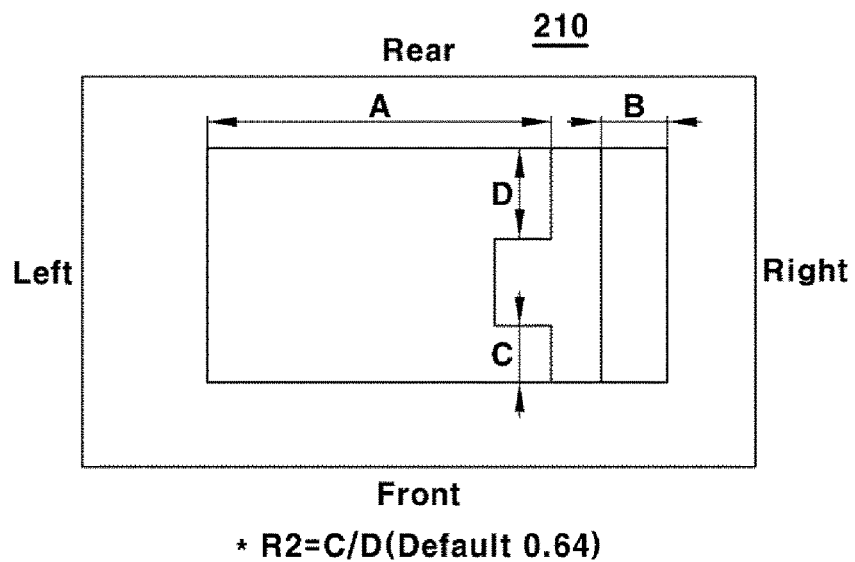
FIG. 3 is an enlarged view of one photosensor according to a form of the present disclosure.

FIG. 3 is an enlarged view of the right photosensor 210 according to a form of the present disclosure.

As described with reference to FIG. 2, the right photosensor 210 is symmetrical to the left photosensor 110 and includes a third window 221 provided close to the side surface of the windshield 300 and a fourth window 222 formed adjacent to the third window 221.

The second dummy portion 230 is located on the fourth window 222 to set the maximum incidence altitude having a maximum amount of light received from the light source 500.

That is, as shown in FIG. 2, the first dummy portion 130 and the second dummy portion 230 are respectively disposed in the left photosensor 110 and the right photosensor 210 to set the maximum incidence altitudes having the maximum amounts of light of the left photosensor 110 and the right photosensor 210.

The maximum amount of light is introduced into the photosensor device 100 located on the inner surface of the windshield 300 inclined at a predetermined angle in the longitudinal direction of the vehicle. That is, the maximum amount of light received by the light reception units 140 and 240 at an incidence altitude is higher or lower than an incidence altitude, at which the light source 500 is located vertically to the surface of the windshield 300 in the longitudinal direction of the vehicle, but not at the incidence altitude, at which the light source 500 is located vertically to the surface of the windshield 300 in the longitudinal direction of the vehicle.

In sum, the incidence altitude having the maximum amount of light in the longitudinal direction of the vehicle through the configuration of the photosensor device 100 including the first dummy portion 130 and the second dummy portion 230 may be slightly different from an angle, at which light from the light source 500 is vertically incident upon the windshield 300. Preferably, the maximum amount of light may be measured by the photosensor device 100 at the incidence altitude of 20 degrees to 40 degrees in the longitudinal direction of the vehicle.

Furthermore, as shown in FIG. 3, the incidence altitude having the maximum amount of light may be set according to the ratio R2=C/D of distance C defined between the front end of the photosensor device 100 and one end of the first or second dummy portion 130 or 230 to distance D defined between the rear end of the photosensor device 100 and the other end of the first or second dummy portion 130 or 230.

In addition, the lateral incidence angle having the maximum amount of light introduced from the light source 500 located at the left side of the vehicle to the right photosensor is determined according to the ratio R1=A/B of the width A of the fourth window 222 to the width B of the third window 221.

The right photosensor 210 is located at the right side of the outside of the windshield 300 of the vehicle 10 and is configured to correspond to the left photosensor 110 symmetrical to the right photosensor 210 in the width direction of the vehicle. Accordingly, the right incidence angle having the maximum amount of light introduced into the left photosensor 110 may be set according to the ratio R1=A/B of the width A of the second window 122 to the width B of the first window 121.

More preferably, since the left photosensor 110 and the right photosensor 210 of the present disclosure are symmetrical to each other, the incidence angles having the maximum amount of light introduced from the light source 500 to the left and right sides of the vehicle are the same.

By the above configuration, the incidence altitude having the maximum amount of light according to the ratio R2=C/D of the distance C from the front end of the photosensor to the distance D from the rear end of the photosensor may be set. In addition, the lateral incidence angle having the maximum amount of light introduced from the light source 500 to the left and right sides of the vehicle according to the ratio R1=A/B of the width A of the second or fourth window 122 or 222 and the first or third window 121 or 221 will be described below.

Figure 4:
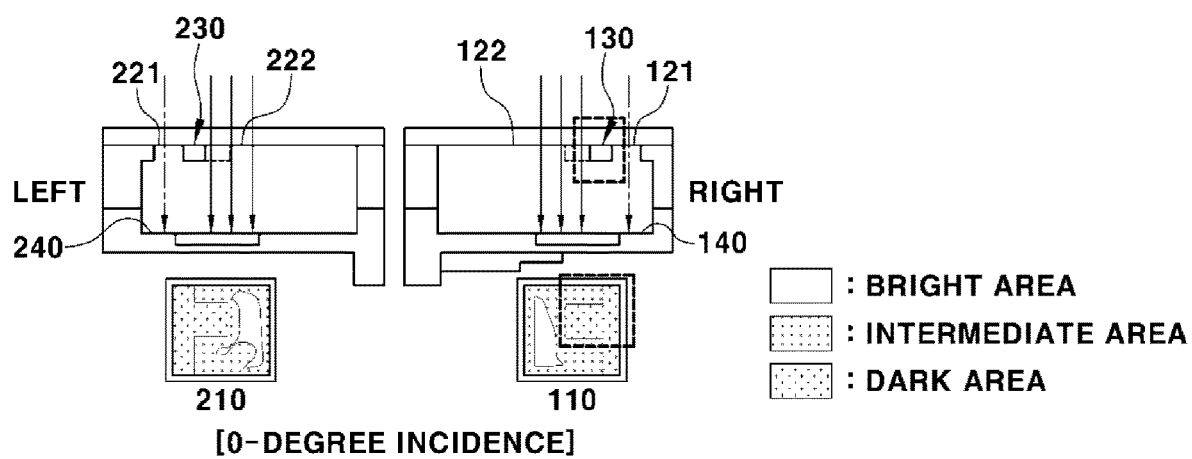
FIG. 4 is a view showing paths of light introduced into two photosensors when a light source is located in a vertical direction according to a form of the present disclosure.

FIG. 4 is a side cross-sectional view of the left photosensor 110 and the right photosensor 210 according to the form of the present disclosure, which shows a light reception area when light of the light source 500 is incident at 0 degrees.

As shown in the figure, when light of the light source 500 is incident at 0 degrees (left and right angles are 0 degrees), the amounts of light introduced into the windows respectively including the dummy portions 130 and 230 and received by the light reception units 140 and 240 are shown.

That is, in the form of the present disclosure, the photosensor device 100 including the dummy portions 130 and 230 is configured to block some of the light introduced into the light reception units 140 and 240 when the lateral incidence angle is 0 degrees.

FIG. 5a shows the bright areas of the light reception units 140 and 240 measured by the light source 500 located at 20 degrees left.

As shown in the figure, the amount of light introduced to the left photosensor 110 located at the right side of the inside of the windshield 300 by the light source 500 located at 20 degrees left in the width direction of the vehicle is relatively higher than that of the right photosensor 210 located at the left side of the inside of the windshield 300.

That is, as shown in the figure, the amount of light introduced from the light source 500 located at 20 degrees left into the left photosensor 110 is higher than the amount of light incident to the incident area of FIG. 4 when the light source 50 is located at 0 degrees.

More preferably, in the form of the present disclosure, the left photosensor 110 has the maximum amount of light at the position of the light source 500 located at 20 degrees left as the lateral incidence angle.

It can be seen that, in the case of the right photosensor 210, the amount of received light is relatively lower than the amount of light received in the light reception area of FIG. 4 when the light source 500 is located at 0 degrees.

That is, the photosensor device 100 located inside the windshield is configured such that the amounts of light introduced into the left photosensor 110 and the right photosensor 210 vary according to the lateral incidence angle of the vehicle, and the air conditioners at individual positions of the vehicle may be operated based on the amount of light received by the left photosensor 110 and the right photosensor 210.

That is, when the amount of light received by the left photosensor 110 is high, air conditioning strength of the passenger seat (the right seat) may be controlled to be relatively higher than that of the driver seat (the left seat).

Figure 5B:
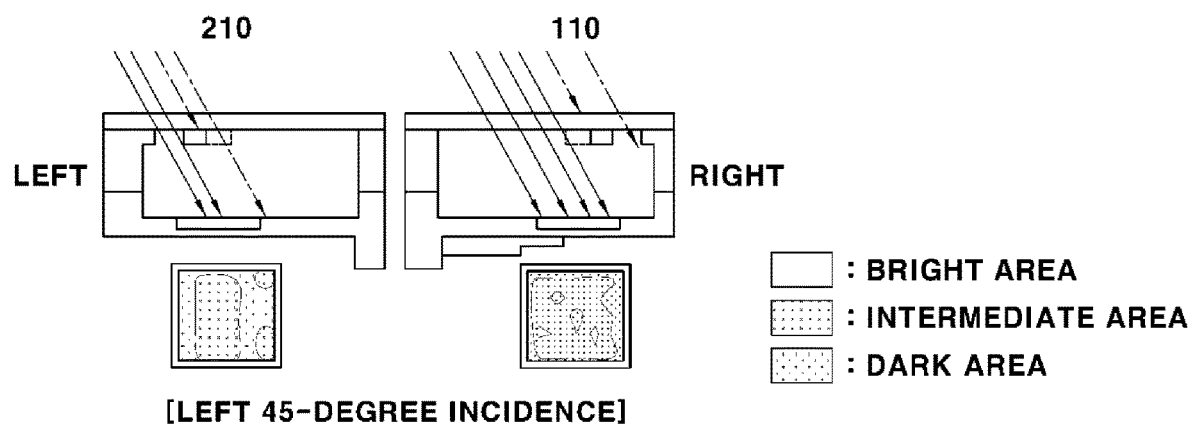
FIG. 5b is a view showing paths of light introduced into two photosensors when a light source has an incidence angle of 45 degrees left according to a form of the present disclosure.

More preferably, as shown in FIG. 5b, in the form of the present disclosure, when the light source 500 is located at 45 degrees left, the amount of light received by the left photosensor 110 is relatively lower than the amount of light received when the light source 500 is located at 20 degrees left.

In sum, as described with reference to FIGS. 5a and 5b, the ratio R1 may be set such that the left photosensor 110 has the maximum amount of received light when the light source 500 is located at 20 degrees left.

Figure 6A:
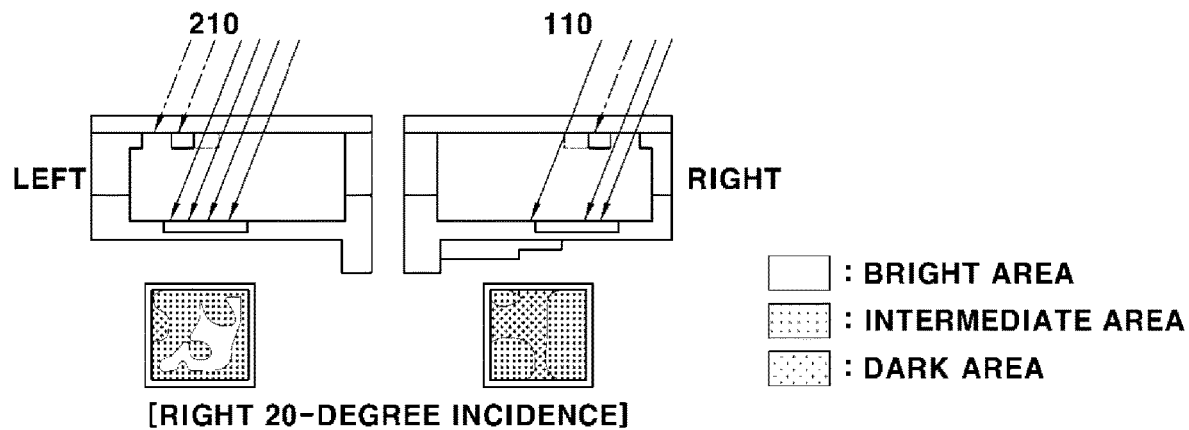
FIG. 6a is a view showing paths of light introduced into two photosensors when a light source has an incidence angle of 20 degrees right according to a form of the present disclosure.

FIG. 6a shows the amount of light introduced into the left photosensor 110 and the right photosensor 210 when the light source 500 is located at 20 degrees right as a lateral incidence angle.

As shown in the figure, when the light source 500 is located at 20 degrees right to have the lateral incidence angle, the amount of light introduced into the right photosensor 210 is relatively higher than the amount of light introduced into the left photosensor 110.

That is, when the light source 500 is located at the right side of the vehicle, the amount of light introduced into the left side (driver) of the vehicle is relatively higher than the amount of light introduced into the right side (passenger) of the vehicle.

Accordingly, the controller 400 may control operation of the air conditioners such that the air conditioning amount of the left air conditioner of the vehicle is relatively higher than the right air conditioner.

Figure 6B:
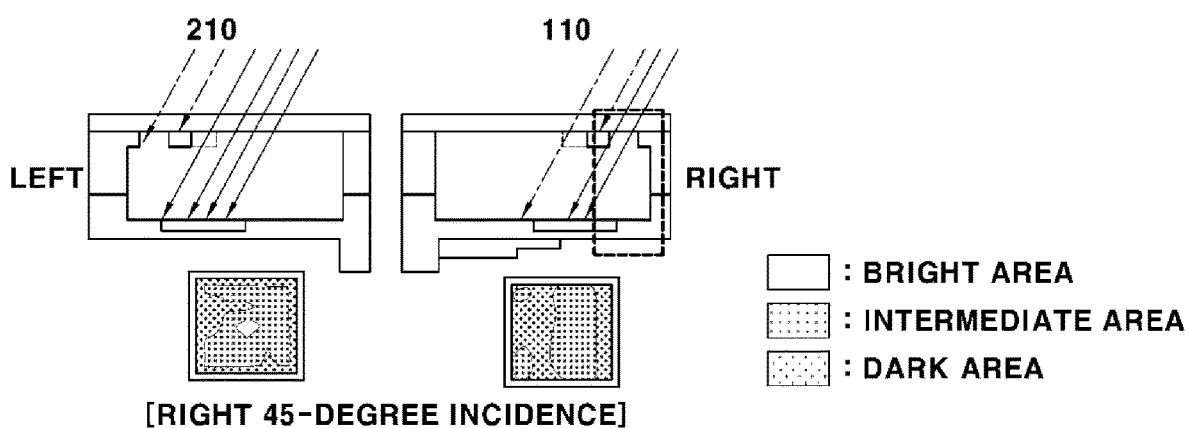
FIG. 6b is a view showing paths of light introduced into two photosensors when a light source has an incidence angle of 45 degrees right according to a form of the present disclosure.

As shown in FIG. 6b, the amount of light received by the right photosensor 210 when the light source 500 is located at 45 degrees right as a lateral incidence angle is relatively lower than the amount of light when the light source is located at 20 degrees right as a lateral incidence angle.

Accordingly, in one form of the present disclosure, the ratio R1 may be set such that the right photosensor 210 has the maximum amount of received light when the right incidence angle is 20 degrees.

As described with reference to FIGS. 4 to 6b, in the form of the present disclosure, the left photosensor 110 has the maximum amount of light when the left incidence angle is 20 degrees and the right photosensor 210 has the maximum amount of light when the right incidence angle is 20 degrees.

More preferably, in the present disclosure, the left and right incidence angles which allow the left photosensor 110 and the right photosensor 210 to have the maximum amount of light are set such that the maximum lateral incidence angle is determined according to the ratio of the widths of the windows disposed in each of the photosensors.

Figure 7:
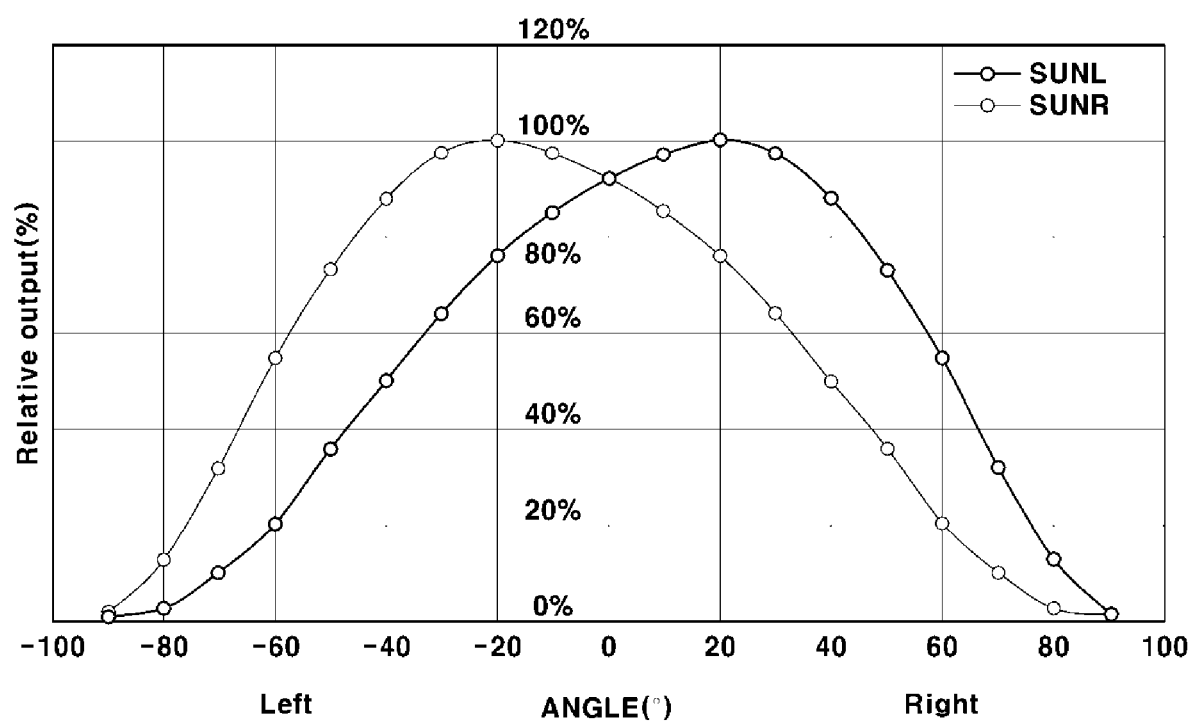
FIG. 7 is a graph showing the amount of light received by two photosensors when a light source moves in the width direction of a vehicle according to a form of the present disclosure.

FIG. 7 is a graph showing the amount of received light when the light source 500 is located at the left or right side of the vehicle according to the form of the present disclosure.

The graph shows that the maximum amounts of light are received by the left photosensor 110 and the right photosensor 210 when the lateral incidence angle of the light source 500 is 20 degrees at left and right sides.

That is, the amount of light introduced into the right photosensor 210 is maximized when the lateral incidence angle of the light source 500 is 20 degrees right, and the amount of light introduced into the left photosensor 110 is maximized when the lateral incidence angle of the light source 500 is 20 degrees left.

In sum, as shown in the figure, in the form of the present disclosure, the ratio R1 is set to 5.25 such that the amount of light introduced into the left photosensor 110 is maximized when the light source 500 is located at 20 degrees left and the amount of light introduced into the right photosensor 210 is maximized when the light source 500 is located at 20 degrees right.

Figure 8:
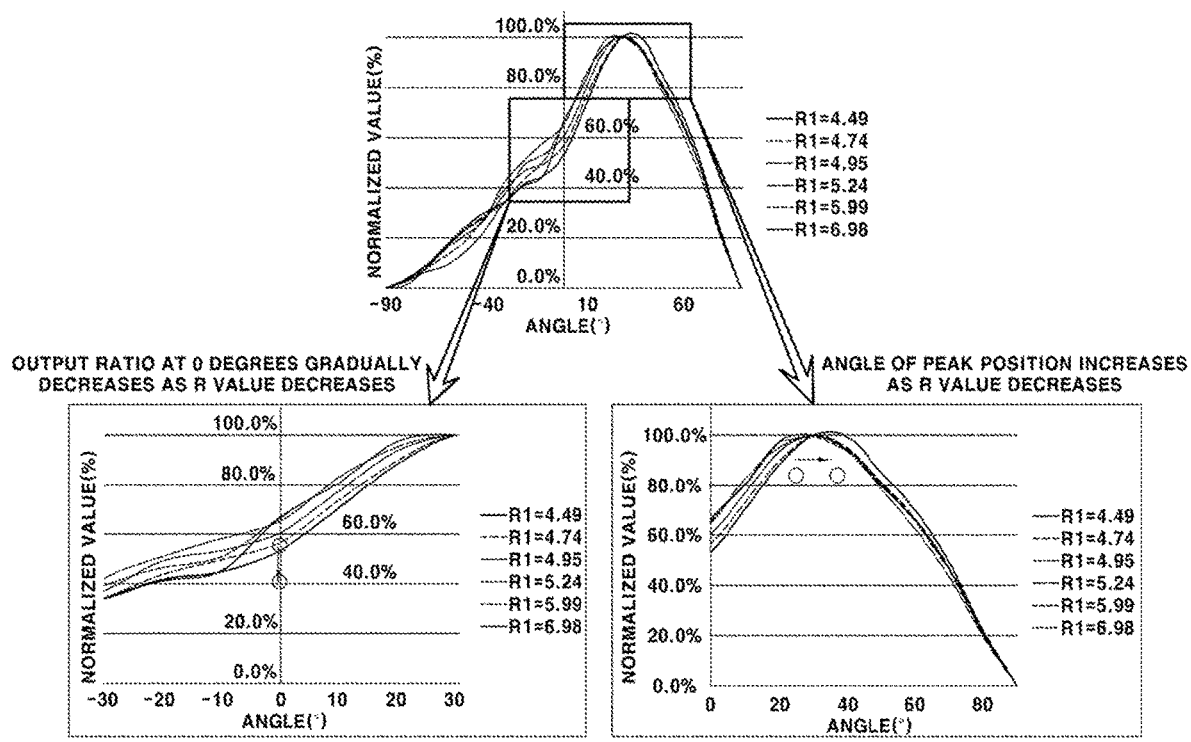
FIG. 8 is a view showing output change of the photosensor according to a ratio of the width of a second window to the width of a first window when a light source moves in the width direction of a vehicle according to a form of the present disclosure.

FIG. 8 shows a relation between the ratio R1 of the right photosensor 210 and the lateral incidence angle having the maximum amount of received light.

In the present disclosure, the ratio R1 means the ratio R1=A/B of the width A of the second window 122 in the left photosensor 110 to the width B of the first window 121 and the ratio R1=A/B of the width A of the fourth window 222 in the right photosensor 210 to the width B of the third window 221.

Further, in the form of the present disclosure, since the ratio R1 of the left photosensor 110 and the ratio R1 of the right photosensor 210 may be the same, FIG. 8 shows change in lateral incidence angle, at which the maximum amount of light is received by the right photosensor 210, according to change in the R1 value.

As shown in the figure, it can be seen that the lateral incidence angle having the maximum amount of received light increases as the R1 value decreases, as a result of performing experimentation while the ratio R1 is changed from 4.49 to 6.98.

In addition, it can be seen that the amount of received light at the incidence angle of 0 degrees decreases as the R1 value decreases, that is, as a difference between the width of the fourth window 222 and the width of the third window 221 decreases.

That is, the lateral incidence angle having the maximum amount of light (received light) may be set through change in the ratio, and the amount of light introduced into the photosensor device 100 may decrease when the light source 500 is located at 0 degrees as an incidence angle.

FIGS. 9a to 9c show the side view of the left photosensor 110 and show the path of light introduced into the photosensor device 100 when the light source 500 is located in front of and behind the vehicle.

The photosensor device 100 of the present disclosure is located on the inner surface and the windshield 300 is inclined at a predetermined angle in the longitudinal direction of the vehicle.

Accordingly, since the photosensor device 100 is attached to the windshield 300 at a predetermined angle to be parallel to the windshield 300, less light than the maximum amount of light is applied to the photosensor device 100 in an area (low altitude) from the incidence angle of 0 degrees to the inclined angle of the photosensor device formed on the windshield 300 in the longitudinal direction of the vehicle.

That is, as shown in FIGS. 9a to 9b, the amount of light introduced into the photosensor device 100 including the first dummy portion 130 and the second dummy portion 230 is lower than the amount of received light shown in FIG. 9c.

That is, the first dummy portion 130 and the second dummy portion 230 included in the photosensor device 100 may be configured to have the maximum amount of received light in an incidence altitude (high altitude) area having greater than the inclination angle of the photosensor device formed on the windshield 300.

More preferably, the incidence altitude having the maximum amount of light received by the photosensor device 100 may be set according to the ratio R2=C/D of the distance from the front end of the photosensor to the distance D from the rear end of the photosensor as the ratio R2 according to the shapes of the first dummy portion 130 and the second dummy portion 230.

FIG. 10 shows the incidence altitude value of the light source 500 having the maximum amount of received light according to the ratio R2.

As shown in the figure, the ratio R2 is set to 0.09 to 1.4 and the incidence altitude having the maximum amount of received light is changed from 15 degrees forward to 40 degrees forward according to the ratio R2.

That is, the dummy portions 130 and 230 change the ratio R2=C/D of the distance C from the front end of the photosensor to the distance D from the rear end of the photosensor to set the incidence altitude of the light source 500 having the maximum amount of received light in the longitudinal direction of the vehicle.

In the present disclosure, since the photosensor device 100 including the two photosensors located inside the windshield 300 is provided, it is possible to provide a photosensor structure capable of determining the difference between the amounts of light received by the photosensors according to the incidence altitude and lateral incidence angle of the light source 500 and controlling the air conditioning amount in each of the driver seat and the passenger seat based on the difference in amount of received light.

The present disclosure can obtain the following effects by the above-described form.

In the present disclosure, since according to the location of the inside of the vehicle, the amount of introduced light is more accurately measured to more accurately control an air conditioner according to a user request, it is possible to provide a photosensor structure coping with the user request.

In addition, in the present disclosure, since the photosensor structure capable of measuring the amount of light incident in a forward-and-backward direction and a left-and-right direction of the vehicle is provided, it is possible to perform comfortable air-conditioning of occupants sitting in the vehicle.

While this disclosure has been described in connection with what is presently considered to be practical exemplary forms, it is to be understood that the disclosure is not limited to the disclosed forms, but, on the contrary, it is intended to cover various modifications and equivalent arrangements included within the spirit and scope of the present disclosure.

What is claimed is:

1. A photosensor structure for a vehicle having a windshield, the vehicle defining a longitudinal axis, the photosensor structure comprising:
   a left photosensor located at a left side of the windshield of the vehicle; and
   a right photosensor located symmetrically to the left photosensor about the longitudinal axis, wherein each of the left and right photosensors includes:
two light reception windows positioned each of the left photosensor and the right photosensor and configured to be located in a width direction of the vehicle to set a lateral incidence angle in a left-and-right direction of a light source;
a dummy portion located between the two light reception windows of each of the left photosensor and the right photosensor to set an incidence altitude in an upward-and-downward direction of the light source; and
light reception units located below each of two the light reception windows to measure an amount of light received from the light source through the two light reception windows.

2. The photosensor structure of claim 1, wherein each of the two light reception windows includes:
a first window located close to a side of the windshield; and
a second window located adjacent to the first window,
wherein the lateral incidence angle having a maximum lateral incidence amount is determined according to a ratio of a width of the second window to a width of the first window.

3. The photosensor structure of claim 2, wherein the lateral incidence angle having the maximum lateral incidence amount of the light source becomes closer to 0° as a ratio (R1=NB) of the width (A) of the second window to the width (B) of the first window increases.

4. The photosensor structure of claim 2, wherein the first window has a smaller width than the second window.

5. The photosensor structure of claim 1, wherein the dummy portion sets the incidence altitude having a maximum incidence amount according to a ratio (R2=C/D) of a distance (C) between a front end of the dummy portion and a front end of a photosensor to a distance (D) between a rear end of the dummy portion and a rear end of the photosensor.

6. The photosensor structure of claim 5, wherein the incidence altitude having the maximum incidence amount increases as the ratio (R2=C/D) increases.

7. The photosensor structure of claim 2, wherein the dummy portion is located at one end of the second window close to the first window.

8. The photosensor structure of claim 1, further comprising a controller configured to control an air conditioner of the vehicle according to the lateral incidence angle and incidence altitude measured by the light reception units according to the amount of light introduced through the left photosensor and the right photosensor.

9. The photosensor structure of claim 8, wherein the controller is configured to compare the amount of light received by the left photosensor and the right photosensor and to control output of the air conditioner located inside the vehicle according to the amount of the received light.

10. The photosensor structure of claim 8, wherein the controller is configured to control output of the air conditioner of the vehicle based on the amount of light applied according to the incidence altitude of the light source.

* * * * *

UNITED STATES PATENT AND TRADEMARK OFFICE
CERTIFICATE OF CORRECTION

PATENT NO. : 11,420,498 B2
APPLICATION NO. : 16/683969
DATED : August 23, 2022
INVENTOR(S) : Jong Min Park et al.

It is certified that error appears in the above-identified patent and that said Letters Patent is hereby corrected as shown below:

In the Claims

Column 11, Claim 3, Line 28: "(R1=NB)" should be replaced with --(R1=A/B)--

Signed and Sealed this
Twenty-ninth Day of November, 2022

Katherine Kelly Vidal
*Director of the United States Patent and Trademark Office*